(12) United States Patent
England et al.

(10) Patent No.: US 8,733,180 B1
(45) Date of Patent: May 27, 2014

(54) AIRFOIL-SHAPED FLUID FLOW TOOL FOR USE IN MAKING DIFFERENTIAL MEASUREMENTS

(75) Inventors: John Dwight England, Arab, AL (US); Anthony R. Kelley, Sommerville, AL (US); Raymond J. Cronise, Huntsville, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 275 days.

(21) Appl. No.: 13/302,845

(22) Filed: Nov. 22, 2011

(51) Int. Cl.
*G01F 1/34* (2006.01)

(52) U.S. Cl.
USPC .......... 73/861.42; 73/861.71; 73/861.65; 73/861.66

(58) Field of Classification Search
USPC .............. 73/861.42, 861.66, 861.65
See application file for complete search history.

(56) References Cited

U.S. PATENT DOCUMENTS

| | | | |
|---|---|---|---|
| 3,558,162 A | | 1/1971 | Ferrai et al. |
| 4,254,664 A | * | 3/1981 | Graham ............... 73/861.58 |
| 4,592,239 A | * | 6/1986 | Cutler ............... 73/861.66 |
| 4,604,906 A | * | 8/1986 | Scarpa ............... 73/861.74 |
| 4,823,615 A | | 4/1989 | Taha |
| 4,920,808 A | * | 5/1990 | Sommer ............... 73/861.42 |
| 4,968,066 A | | 11/1990 | Adams |
| 5,612,499 A | | 3/1997 | Andrew et al. |
| 5,853,030 A | | 12/1998 | Walding |
| 5,971,001 A | | 10/1999 | Andersson |
| 6,928,884 B1 | * | 8/2005 | Pearson ............... 73/861.65 |
| 7,001,106 B2 | | 2/2006 | Burnham et al. |
| 7,070,209 B2 | | 7/2006 | Collins |
| 7,228,750 B2 | * | 6/2007 | Brandt, Jr. ............... 73/861.65 |
| 7,497,772 B2 | | 3/2009 | Laib |
| 7,674,072 B2 | | 3/2010 | Shook et al. |
| 7,681,461 B2 | | 3/2010 | Rosenbaum et al. |
| 7,735,381 B2 | | 6/2010 | Lodolo |
| 2007/0193368 A1 | * | 8/2007 | Speldrich ............... 73/861.52 |
| 2009/0139348 A1 | * | 6/2009 | Speldrich ............... 73/861.66 |

FOREIGN PATENT DOCUMENTS

EP 0249362 A1 12/1987

* cited by examiner

*Primary Examiner* — Lisa Caputo
*Assistant Examiner* — Philip Cotey
(74) *Attorney, Agent, or Firm* — Peter J. Van Bergen; James J. McGroary

(57) ABSTRACT

A fluid flow tool includes an airfoil structure and a support arm. The airfoil structure's high-pressure side and low-pressure side are positioned in a conduit by the support arm coupled to the conduit. The high-pressure and low-pressure sides substantially face opposing walls of the conduit. At least one measurement port is formed in the airfoil structure at each of its high-pressure side and low-pressure side. A first manifold, formed in the airfoil structure and in fluid communication with each measurement port so-formed at the high-pressure side, extends through the airfoil structure and support arm to terminate and be accessible at the exterior wall of the conduit. A second manifold, formed in the airfoil structure and in fluid communication with each measurement port so-formed at the low-pressure side, extends through the airfoil structure and support arm to terminate and be accessible at the exterior wall of the conduit.

10 Claims, 3 Drawing Sheets

AIRFOIL-SHAPED FLUID FLOW TOOL FOR USE IN MAKING DIFFERENTIAL MEASUREMENTS

ORIGIN OF THE INVENTION

The invention described herein was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to flow measurement tools. More specifically, the invention is an airfoil-shaped device that, when placed in a conduit, can be used in making differential measurements in a flow.

2. Description of the Related Art

For a variety of reasons, devices are needed that can be adapted to an existing fluid conduit for the temporary or permanent provision of specific functions. One such function is the measurement of a parameter of a flowing fluid. Other functions include mixing the flowing fluid and/or injecting a second fluid into the (main) flowing fluid. With respect to parameter measurement, attributes of interest include pressure, velocity, density, temperature, etc. Currently, many flow "measurement" devices collect flow information that is then used in some approximation or modeling scheme to estimate flow attributes. In addition, current flow measurement devices are installed by cutting fully through existing conduits and then "splicing" the flow measurement devices into the conduit. This can be time consuming, tedious, and costly. This is especially problematic when making differential measurements (i.e., at two spaced apart locations along a conduit) as multiple devices must be spliced into a conduit with the entire installation then requiring calibration to account for installation irregularities. Still further, current differential flow measurement devices can create substantial pressure losses effecting pump efficiency. Flow measurement devices can also be the source of a blockage in a conduit when solids and/or foreign matter are present in a flowing fluid (e.g., man-made debris, natural debris such as hair, sticks, leaves, etc.). For example, a flow measurement device such as an orifice plate is readily clogged with debris thereby impacting flow measurements and the flow itself.

SUMMARY OF THE INVENTION

Accordingly, it is an object of the present invention to provide a fluid flow tool that can be used when making differential measurements in a flowing fluid.

Another object of the present invention is to provide a fluid flow tool that can be readily installed in an existing conduit in preparation for making differential measurements of a fluid flow moving through the conduit.

Still another object of the present invention is to provide a flowing-fluid differential measurement-supporting tool that is resistant to clogging.

Other objects and advantages of the present invention will become more obvious hereinafter in the specification and drawings.

In accordance with the present invention, a fluid flow tool is provided for use in making differential measurements of flow attributes. The tool includes an airfoil structure having a shape that inherently defines a high-pressure side and a low-pressure side. The tool also includes a support arm coupled to the airfoil structure and adapted to be coupled to an exterior wall of a conduit such that the airfoil structure's high-pressure side and low-pressure side substantially face opposing walls of the conduit. At least one measurement port is formed in the airfoil structure at its high-pressure side. A first manifold is formed in the airfoil structure and is in fluid communication with each measurement port so-formed at the high-pressure side. The first manifold extends through the airfoil structure and support arm to terminate and be accessible at the exterior wall of the conduit. At least one measurement port is formed in the airfoil structure at its low-pressure side. A second manifold is formed in the airfoil structure and is in fluid communication with each measurement port so-formed at the low-pressure side. The second manifold extends through the airfoil structure and support arm to terminate and be accessible at the exterior wall of the conduit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
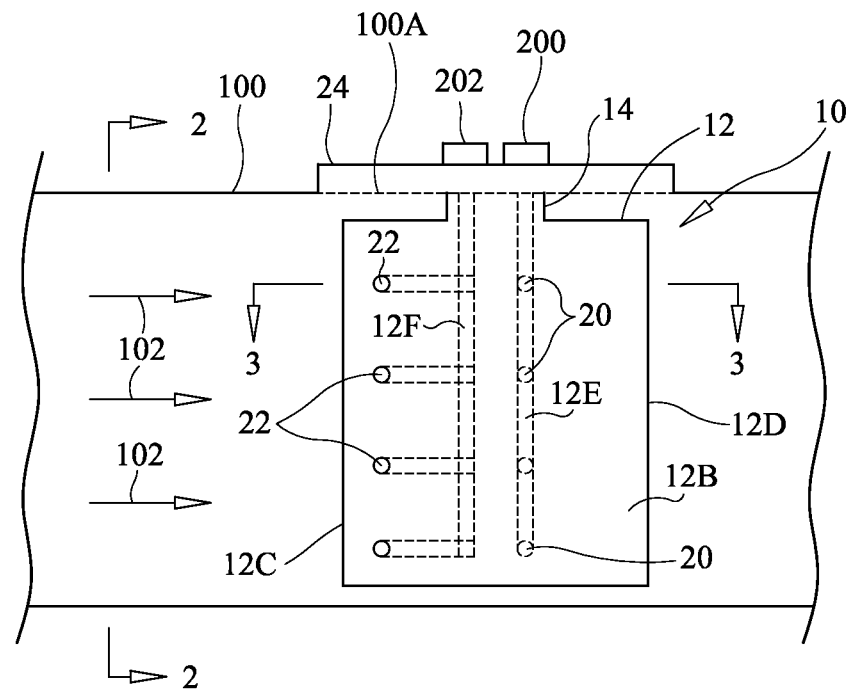
FIG. 1 is a side view of a fluid flow tool used to facilitate differential measurements in accordance with an embodiment of the present invention.

Referring now to the drawings, simultaneous reference will be made to FIGS. 1-3 where side, head-on, and cross-sectional views, respectively, of a fluid flow tool used to facilitate the collection of differential measurements in a fluid flow in accordance with an embodiment of the present invention is shown and is referenced generally by numeral 10. Tool 10 is positioned/mounted in a conduit 100 that carries a flowing fluid moving in a known direction where such fluid and its flow direction are indicated by arrows 102. The terms "upstream" and "downstream" as used herein are referenced to the flow direction of fluid flow 102. Fluid flow 102 can be a gas, vapor, a pure liquid, or a gas or liquid mixed with some solids that are present by design or by circumstance. For example, fluid flow 102 could contain natural or man-made debris that must pass through conduit 100 and past device 10 to maintain flow efficiency.

In general, tool 10 is a self-contained device that positions measurement ports in fluid flow 102 in a pre-determined and definitive manner such that differential measurements concerning flow 102 can be made easily and precisely. As will be explained further below, a measurement port can be sized to permit entry of fluid into tool 10 or sized to simply receive signal wires for coupling to a sensor positioned on tool 10 at the measurement port. Tool 10 includes a structure 12 that is shaped like an airfoil (hereinafter referred to simply as "airfoil 12") and a support arm 14 coupled to airfoil 12 and to conduit 100 as will be explained further below. It is to be understood that the specific airfoil type and shape are not limitations of the present invention and that the airfoil type/shape can be selected/designed based on the flow environment of interest.

Airfoil 12 can be a conventionally-shaped airfoil (as shown) having a shaped side 12A opposing a generally flat side 12B with shaped side 12A and generally flat side 12B meeting at a leading edge 12C and a trailing edge 12D. Airfoil 12 is positioned in conduit 100 by support arm 14 with leading edge 12C located upstream of trailing edge 12D so that sides 12A/12B substantially face opposing walls of conduit 100. The nature of the airfoil shape means that one side of airfoil 12 inherently creates/defines a higher pressure in the adjacent fluid flow with respect to the other side of airfoil 12 thereby creating a shape-induced pressure differential between the opposing sides of airfoil 12. The resultant pressure differential for a given airfoil type/shape can also be adjusted by changing the angle-of-attack of the airfoil with respect to the direction of oncoming fluid flow 102. For purpose of this description, it will be assumed that shaped side 12A forms a low-pressure side of airfoil 12 and generally flat side 12B forms a high-pressure side of air foil 12 as fluid flow 102 passes thereby. Thus, a flow region 16 of fluid flow 102 passing shaped side 12A experiences a different flow environment than a flow region 18 of fluid flow 102 passing flat side 12B. It is to be understood that the angle-of-attack of airfoil 12 in fluid flow 102 can be varied from that shown without departing from the scope of the present invention.

Measurement ports are provided in tool 10 to facilitate differential measurements concerning fluid flow 102. That is, measurement ports are located in tool 10 where fluid flow 102 reacts differently (i.e., in flow regions 16 and 18) as it moves past tool 10 so that tool 10 with its measurement ports create a differential measurement environment. As will be explained further below by way of illustrative examples, the ports can be fluidly coupled to sensors located outside of conduit 100 using one or more manifolds formed in airfoil 12 and support arm 14. However, the present invention is not so limited as the ports can simply serve as an egress for signal wires (not shown) that are to be connected to sensors (e.g., stress or strain sensors) located at the measurement ports. Such signal wires would be led through manifold(s) formed in airfoil 12 and support arm 14 for ultimate connection to measurement electronics (not shown).

The above-described elements of tool 10 can be separate elements coupled to one another or they can be formed as an integrated device (e.g., molded as one piece). In either case, tool 10 can be installed as part of conduit 100 or can be installed in an existing conduit 100. In terms of an existing conduit 100, an installation/entry aperture (indicated by dashed line 100A) is cut in conduit 100. Aperture 100A is sized/shaped to receive tool 10 therethrough. Since the largest part of tool 10 is its airfoil structure whose thickness (between shaped side 12A and generally flat side 12B) will generally be much less than the diameter of conduit 100, aperture 100A need only be a single, longitudinally-oriented slot cut partially into conduit 100. Once positioned in conduit 100, tool 10 is coupled and sealed to conduit 100 by means of a mounting/sealing arrangement 24, the design of which is not a limitation of the present invention. That is, support arm 14 is coupled to mounting/sealing arrangement 24. Since conduit 100 need only have a single aperture/slot 100A cut therein, the overall integrity, shape, and size of conduit 100 is maintained such that tool 10 has little or no impact on the existing system.

As mentioned above, one or more measurement ports are provided in tool 10 at locations that facilitate differential measurements associated with fluid flow 102. A variety of measurement port placements can be utilized without departing from the present invention. By way of illustrative examples, several port placements will be discussed and illustrated herein. However it is to be understood the present invention is not limited to these examples.

Figure 2:
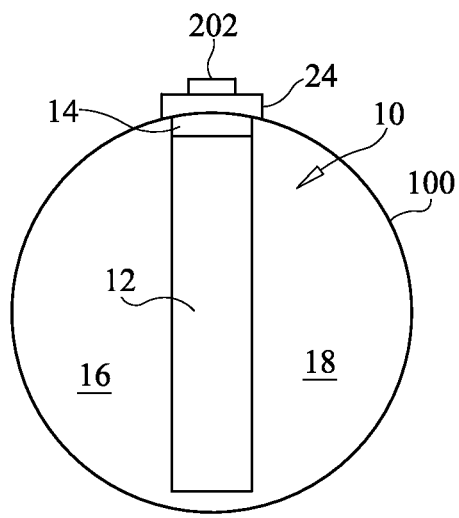
FIG. 2 is a head-on view of the fluid flow tool taken from an upstream location indicated by line 2-2 in FIG. 1.
Figure 3:
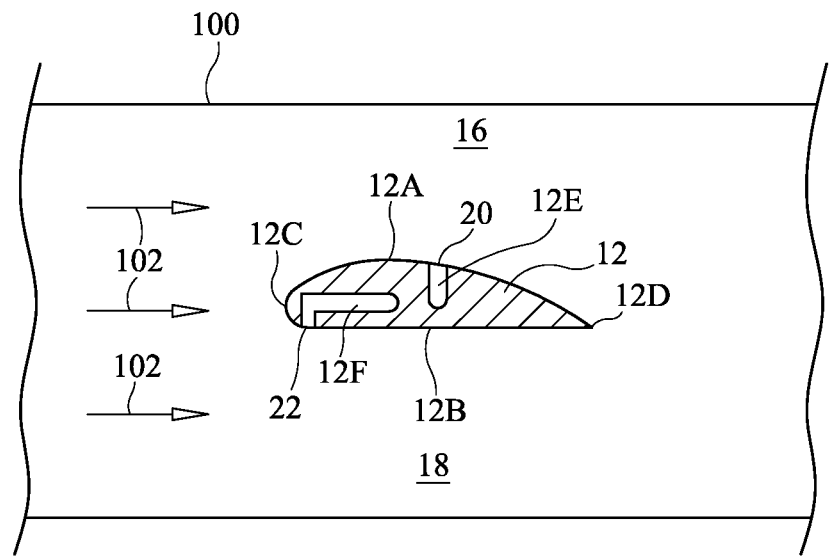
FIG. 3 is a cross-sectional view of the fluid flow tool taken along line 3-3 in FIG. 1.

Referring first to the embodiment illustrated in FIGS. 1-3, tool 10 creates a differential measurement environment between flow regions 16 and 18. More specifically, a number of ports 20 are provided in a spaced-apart arrangement along a span of airfoil 12 on shaped side 12A thereof. Each of ports 20 communicates with flow region 16 adjacent the low-pressure/shaped side 12A of airfoil 12. Note that the particular span of airfoil 12 selected for ports 20 is not a limitation of the present invention. A similar spaced-apart arrangement of ports 22 is provided along a span of airfoil 12 on flat side 12B thereof. Each of ports 22 communicates with flow region 18 adjacent the high-pressure/flat side 12B of airfoil 12. The particular span of airfoil 12 selected for ports 22 is also not a limitation of the present invention.

Measurement ports 20 are fluidly coupled to a sensor 200 outside of conduit 100 by a single/common manifold 12E formed in airfoil 12 and support arm 14. Similarly, measurement ports 22 are fluidly coupled to a sensor 202 outside of conduit 100 by a single/common manifold 12F in airfoil 12 and support arm 14. Sensors 200 and 202 are used to collect information concerning fluid flow 102 in flow regions 16 and 18, respectively. Each of sensors 200 and 202 can be a pressure sensor, strain or stress gauge, fiber optic sensor, etc., and can be used in conjunction with a temperature sensor.

The use of a plurality of ports along a span of airfoil 12 allows the fluid attributes along that span to be averaged when a single/common manifold is used to fluidly couple the ports to a single sensor. However, the present invention is not so limited as port placement and manifold-to-sensor fluidic coupling could be different than that shown without departing from the scope of the present invention. For example, if the attributes of fluid flow 102 in a particular region of conduit 100 were of interest (e.g., center region of conduit 100, region near a wall of conduit 100, etc.), corresponding port placement in airfoil 12 could be provided along with unique manifold-to-sensor fluidic coupling.

Figure 4:
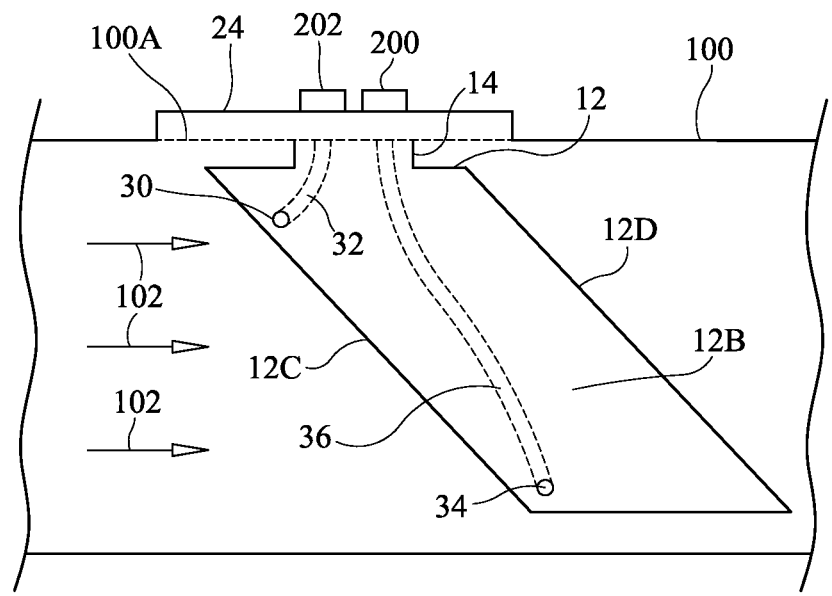
FIG. 4 is a side view of a fluid flow tool installed in a conduit such that it forms a non-perpendicular angle with respect to the direction of an oncoming fluid flow in accordance with another embodiment of the present invention.

In the embodiment illustrated in FIGS. 1-3, airfoil 12 is positioned in conduit 100 such that its span (e.g., along the linear array of ports 20 or ports 22) is perpendicular to fluid flow 102. However, the present invention is not so limited. For example, FIG. 4 illustrates airfoil 12 positioned in conduit 100 such that a span of airfoil 12 is swept downstream at a non-perpendicular angle with respect to the direction of oncoming fluid flow 102. Leading edge 12C and/or trailing edge 12D of airfoil 12 can be straight (as shown) or curved (along with the airfoil's span) without departing from the scope of the present invention. This non-perpendicular positioning of airfoil 12 and its corresponding span reduces or eliminates collection of solids/debris (that might be present in fluid flow 102) on airfoil 12 as fluid flow 102 passes thereby.

The non-perpendicular positioning of airfoil 12 can also be used to facilitate upstream/downstream differential measurements. For example, an upstream port 30 (e.g., in flat side 12B) could be coupled to sensor 202 by a manifold 32 formed in airfoil 12 and support arm 14, while a downstream port 34

(e.g., in flat side 12B) could be coupled to sensor 200 by a manifold 34 formed in airfoil 12 and support arm 14. As in the previous embodiments, the sensors could be located outside of conduit 100.

Figure 5:
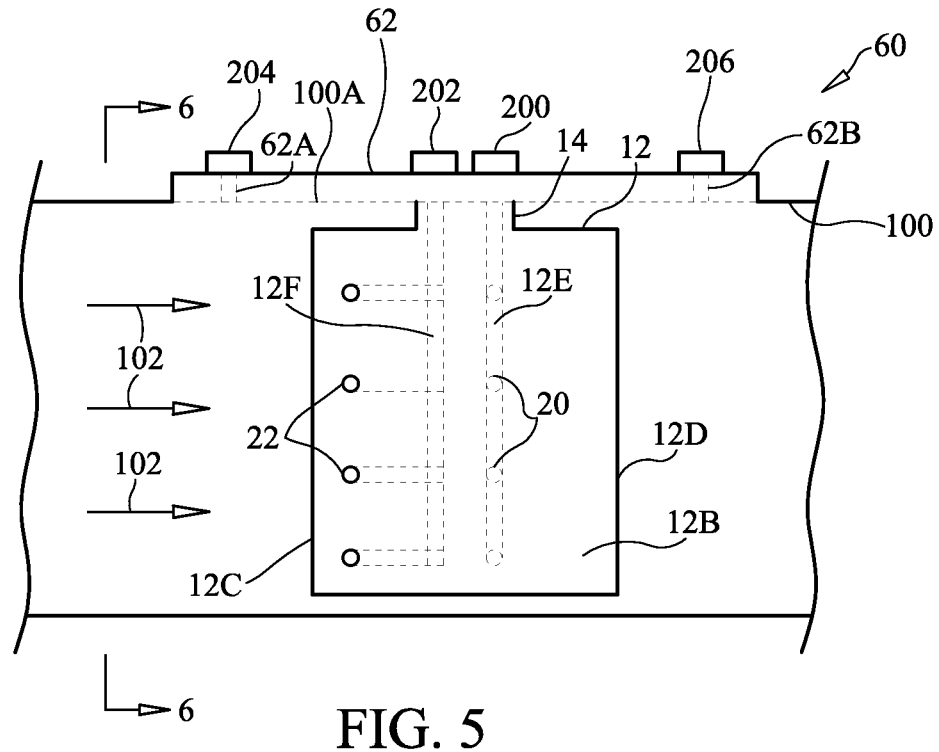
FIG. 5 is a side view of an integrated fluid flow tool in accordance with another embodiment of the present invention.
Figure 6:
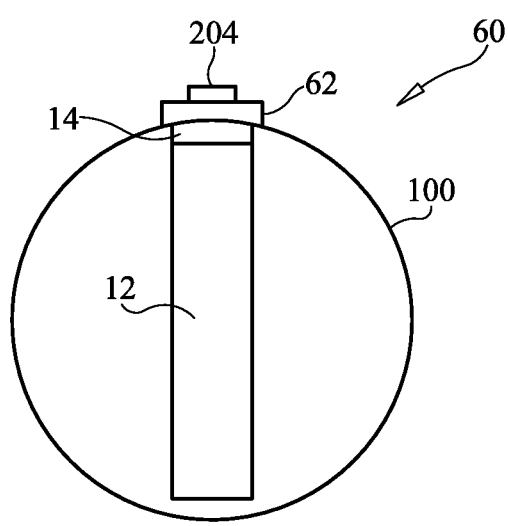
FIG. 6 is a head-on view of the fluid flow tool taken from an upstream location indicated by line 6-6 in FIG. 5.

As mentioned above, the fluid flow tool of the present invention can be constructed as an integrated device. Accordingly, another embodiment of the present invention is illustrated in FIGS. 5 and 6 where an integrated fluid flow tool is referenced generally by numeral 60. The elements of tool 60 that are common with those of the previously-described tool 10 are referenced using the same reference numbers. In this embodiment, tool 60 also includes the mounting structure that couples tool 60 to conduit 100. More specifically, tool 60 has a mounting plate 62 integrated with the tool's support arm 14. Plate 62 is larger than the size of aperture 100A so that mounting plate 62 rests on conduit 100 as the remaining portions of tool 60 are suspended within conduit 100 as previously described. The sealing and coupling of plate 62 to conduit 100 can be accomplished in a variety of ways without departing from the scope of the present invention.

Mounting plate 62 can incorporate one or more measurement ports/manifolds positioned so that measurements of attributes of fluid flow 102 can be collected just upstream and/or downstream of the portions of tool 60 residing within conduit 100. For example, in the illustrated embodiment, an upstream measurement port/manifold 62A and a downstream measurement port/manifold 62B are formed through plate 62. Each port/manifold 62A and 62B is fluidly coupled to a separate sensor 204 and 206, respectively. It is to be understood that the number and location of ports in plate 62 can be varied from the illustrated embodiment without departing from the scope of the present invention. Separate sensors 204 and 206 are positioned outside of conduit 100. Each sensor is used to collect flow information concerning fluid flow 102 in different upstream or downstream portions thereof. Similar to sensors 200 and 202, each of sensors 204 and 206 can be a pressure sensor, strain gauge, fiber optic sensor, etc., and can be used in conjunction with a temperature sensor.

The advantages of the present invention are numerous. The self-contained fluid flow tool will provide for multiple differential measurements in a fluid flow. The airfoil shape of the tool and its angle-of-attack can be readily adjusted to provide a corresponding adjustment in the amount of pressure differential. The tool is easily installed in existing conduits and does not disturb the basic conduit installation or structural integrity. The tool's measurements ports are fixed/known 'a priori' thereby eliminating the need for calibration at each installation. The tool can be positioned to greatly reduce or eliminate the possibility of being clogged with foreign matter and debris and will, therefore, require little or no maintenance and will not impact flow/pump efficiencies. The multiple differential measurement locations enable flow cross-checking to evaluate proper instrumentation function and to calculate flowing fluid properties such as density, viscosity, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A fluid flow tool for use in making differential measurements of flow attributes, comprising:
    an airfoil structure having a flat surface that defines a high-pressure side of said airfoil structure and a shaped surface that defines a low-pressure side of said airfoil structure, said flat surface and said shaped surface meeting at a leading edge of said airfoil structure and a trailing edge of said airfoil structure;
    a support arm coupled to said airfoil structure and coupled to an exterior wall of a conduit wherein said flat surface and said shaped surface face opposing walls of the conduit;
    at least one measurement port formed in said flat surface of said airfoil structure between said leading edge and said trailing edge;
    a first manifold formed in said airfoil structure and in fluid communication with each said measurement port so-formed in said flat surface, said first manifold extending through said airfoil structure and said support arm to terminate and be accessible at the exterior wall of the conduit;
    at least one measurement port formed in said shaped surface of said airfoil structure between said leading edge and said trailing edge; and
    a second manifold formed in said airfoil structure and in fluid communication with each said measurement port so-formed in said shaped surface, said second manifold extending through said airfoil structure and said support arm to terminate and be accessible at the exterior wall of the conduit.

2. A fluid flow tool as in claim 1, wherein said at least one measurement port so-formed in said flat surface comprises a plurality thereof distributed along a span of said airfoil structure and in fluid communication with said first manifold.

3. A fluid flow tool as in claim 1, said at least one measurement port so-formed in said shaped surface comprises a plurality thereof distributed along a span of said airfoil structure and in fluid communication with said second manifold.

4. A fluid flow tool as in claim 1, wherein a span of said airfoil structure is at a perpendicular angle with respect to a direction of the fluid flow.

5. A fluid flow tool as in claim 1, wherein a span of said airfoil structure is at a non-perpendicular angle with respect to a direction of the fluid flow.

6. A fluid flow tool for use in making differential measurements of attributes of a fluid moving in a flow direction through a conduit, comprising:
    an airfoil structure having a flat surface that defines a high-pressure side of said airfoil structure and a shaped surface that defines a low-pressure side of said airfoil structure, said flat surface and said shaped surface meeting at a leading edge of said airfoil structure and a trailing edge of said airfoil structure;
    a support arm coupled to said airfoil structure and coupled to an exterior wall of the conduit wherein said support arm positions said airfoil structure in the conduit such that said flat surface and said shaped surface face opposing walls of the conduit, and wherein a first flow region is defined adjacent said flat surface and a second flow region is defined adjacent said shaped surface;
    at least one measurement port formed in said flat surface of said airfoil structure between said leading edge and said trailing edge and in fluid communication with said first flow region;
    a first manifold formed in said airfoil structure and in fluid communication with each said measurement port so-communicating with said first flow region, said first manifold extending through said support arm to terminate and be accessible at the exterior wall of the conduit;
    at least one measurement port formed in said shaped surface of said airfoil structure between said leading edge and said trailing edge and in fluid communication with said second flow region; and at least one second manifold formed in said airfoil structure and in fluid communication with each said measurement port so-communicating with said second flow region, each said second manifold extending through said support arm to terminate and be accessible at the exterior wall of the conduit.

7. A fluid flow tool as in claim 6, wherein said at least one measurement port so-formed in said flat surface comprises a plurality thereof distributed along a span of said airfoil structure and in fluid communication with said first manifold.

8. A fluid flow tool as in claim 6, said at least one measurement port so-formed in said shaped surface comprises a plurality thereof distributed along a span of said airfoil structure and in fluid communication with said second manifold.

9. A fluid flow tool as in claim 6, wherein a span of said airfoil structure is at a perpendicular angle with respect to a direction of the fluid flow.

10. A fluid flow tool as in claim 6, wherein a span of said airfoil structure is at a non-perpendicular angle with respect to a direction of the fluid flow.

\* \* \* \* \*